March 23, 1937. T. G. WARE 2,074,630
AUTO SEAT COVER
Filed Dec. 12, 1935 5 Sheets-Sheet 3

Inventor
T. G. Ware

By Clarence A. O'Brien and
Hyman Berman Attorneys

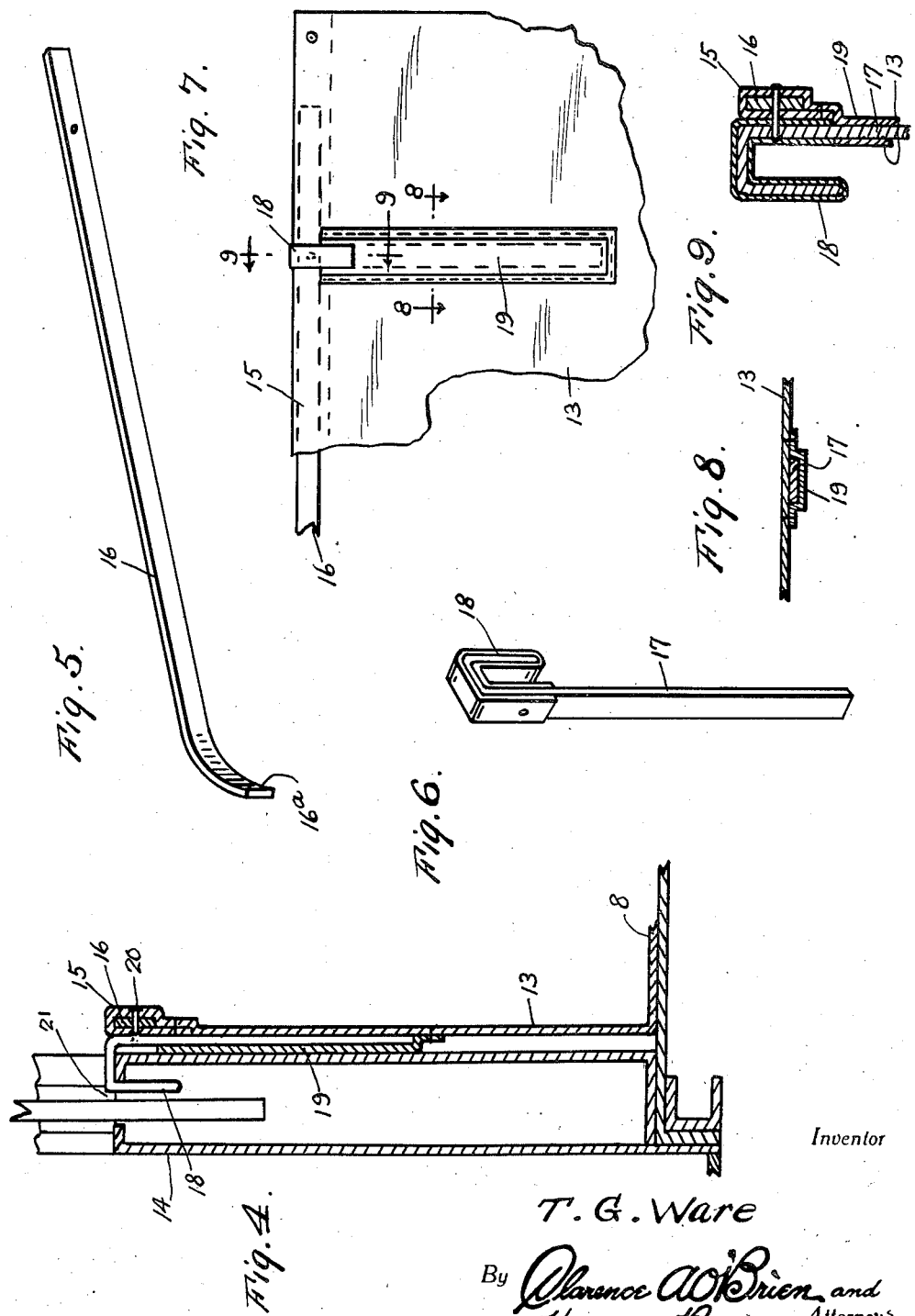

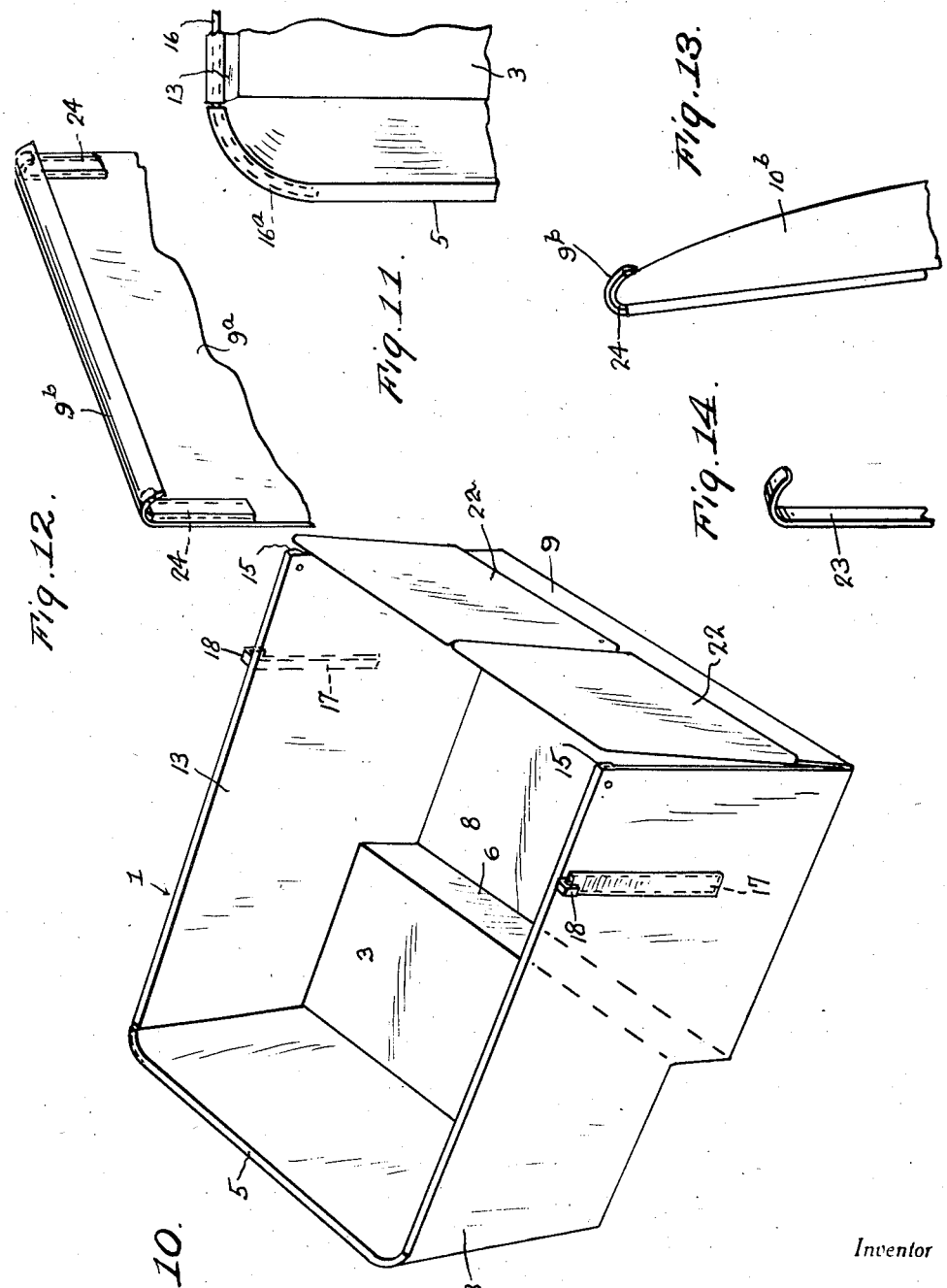

Patented Mar. 23, 1937

2,074,630

UNITED STATES PATENT OFFICE 2,074,630

AUTO-SEAT COVER

Thomas G. Ware, Newnan, Ga.

Application December 12, 1935, Serial No. 54,127

1 Claim. (Cl. 296—1)

This invention relates to covers for automobile seats and the object of the invention is to provide a novel form of cover which will serve to protect the upholstery in such a manner that the tonneau of the "closed type" automobile body may be used by sportsmen, salesmen, and the like for carrying such articles as would otherwise tend to discolor, dirty and otherwise render the upholstery unsightly.

Further in accordance with the present invention a cover is provided which will protect the entire upholstery in the back of the car, the floor, the top and back of the front seat or seats and which can be secured in place in a convenient and practical manner.

The invention together with its objects and advantages will be best understood from a study of the following description taken in connection with the accompanying drawings wherein:

Figure 4 is an enlarged detail sectional view showing the manner of securing a side of the cover member to a door of the automobile.

Figure 5 is a perspective view of a metal strip forming part of the invention.

Figure 6 is a perspective view of a retaining hook.

Figure 7 is an enlarged elevational view taken substantially at right angles to Figure 4 and illustrating certain details hereinafter more fully referred to.

Figure 1:
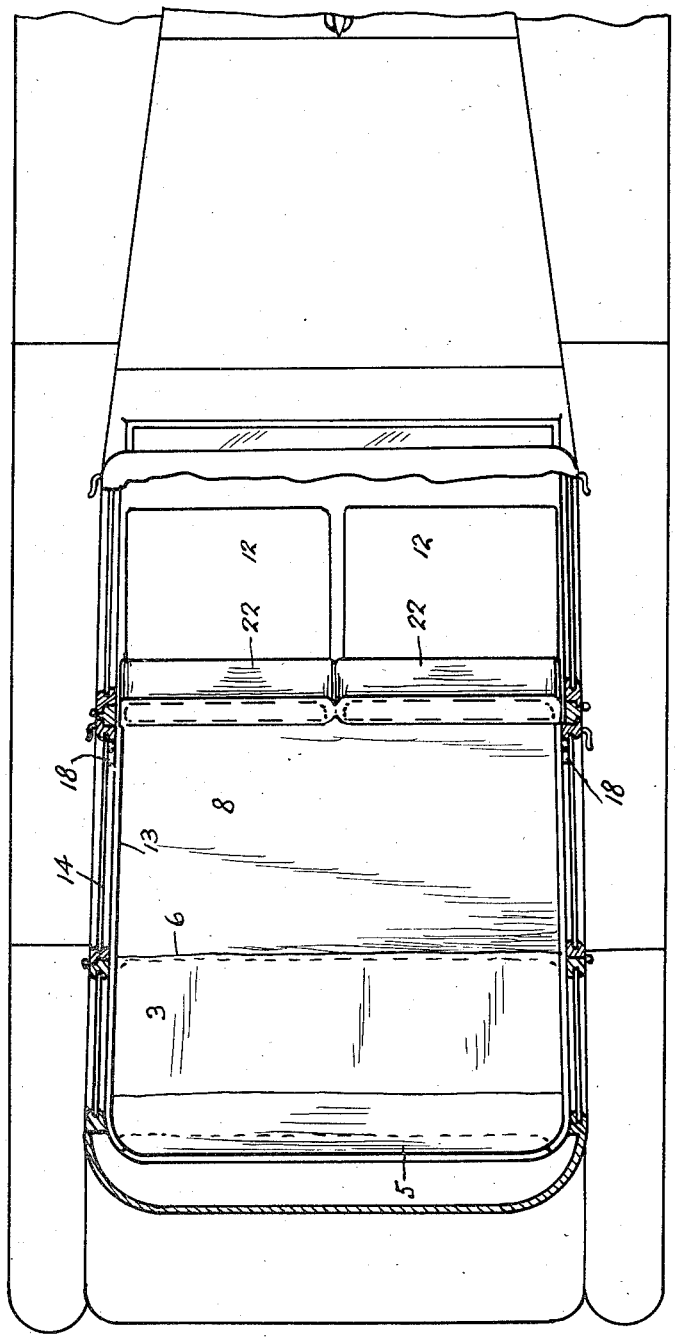
Figure 1 is a top plan view of the cover in position with parts of the automobile broken away and shown in section.

Figures 8 and 9 are detail sectional views taken substantially on the lines 8—8 and 9—9 of Figure 7.

Figure 10 is a perspective view of the cover.

Figure 11 is a fragmentary detail plan view at a rear corner of the cover.

Figure 12 is a perspective view of a modified form of front seat protector section of the cover.

Figure 13 is a detail elevational view showing the manner of engaging the portion of the cover shown in Figure 12 with the upper edge of the front seat of an automobile.

Figure 14 is a fragmentary perspective view of a retaining hook forming part of the structure shown in Figure 12.

Referring to the drawings by reference numerals it will be seen that the improved cover is indicated generally by the reference numeral 1.

The cover 1 is formed of any suitable material such as for example a waterproof, fire resistant eight ounce army duck, cut, shaped and dimensioned to fit conformably within the tonneau of the automobile 2 whether the same be of the four door or two door type of closed body.

As clearly shown in Figure 1 when the cover is in position within the automobile the same presents a section 3 which covers the upholstery of the rear seat 4; an integral section 5 which covers the front of the seat back 4a, an integral section 6 which extends downwardly as a protecting apron for the seat support 7, an integral floor covering 8 and a covering 9 for the rear faces of the back 10 and supports 11 of the front seats 12.

Further the cover has integral side sections 13 which serve to protect the upholstery on the opposite side walls of the tonneau of the vehicle body as well as the upholstery on the rear doors 14 of the automobile body.

The side sections 13 are provided at their upper edges with hems 15 in which are secured flat metallic reinforcing strips 16 which at one end project beyond the corresponding ends of the sides 13 and are curved as at 16a.

Figure 2:
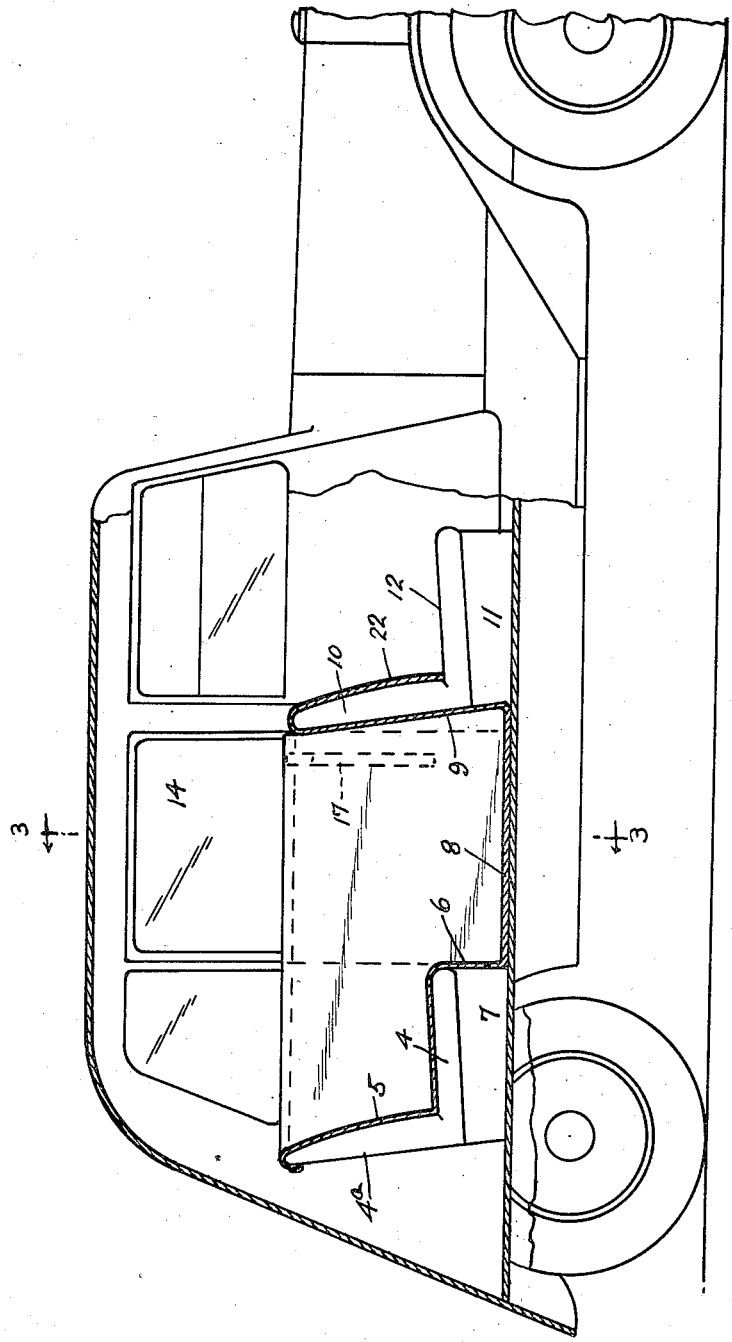
Figure 2 is a view partly in section and partly in elevation further illustrating the invention.
Figure 3:
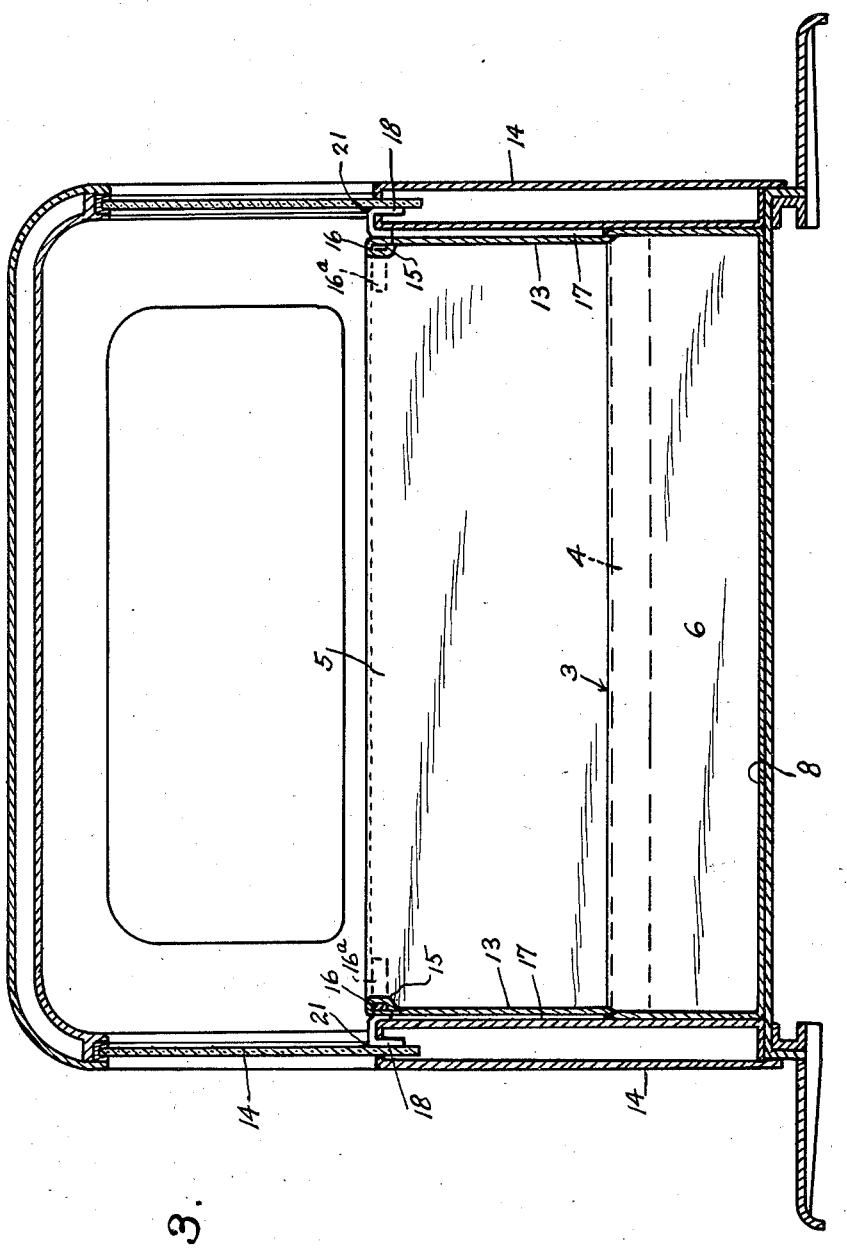
Figure 3 is a detail view taken substantially on the line 3—3 of Figure 2.

The section 5 of the cover which serves to protect the back 4a of the rear seat 4 has its upper edge adapted to be folded over the upper edge of the seat back 4a as shown in Figure 2 and the upper edge portion of the seat back covering 5 and the sides 13 are separated as suggested in Figure 11.

At its folded edge the back cover section 5 is provided with a hem which at its opposite ends is opened so as to receive the curved ends 16a of the strips 16 in a manner clearly suggested in Figure 11 whereby the strips 16 serve to retain the upper edge of the cover section 5 in folded position over the edge of the seat back 4a.

The sides 13 are retained in proper position relative to the side walls and the rear doors of the automobile through the medium of hooks 17 the bill portions of which are covered with rubber as at 18.

The shanks of the hooks 17 are received in vertical pockets 19 suitably provided on the outer faces of the cover sides 13 as clearly shown in Figures 4, 7 and 8, rivets 20 serving to secure the shanks of the hooks 17 within their pockets 19 and also serving to secure the strips 16 within the hems 15 of the cover sides 13.

As shown in Figure 4 the covered ends 18 of the hooks 17 engage in the window slots 21 of the doors 14 and thereby serve to hold the cover sides 13 in proper position.

Where the cover member 1 is to be used with that type of body construction wherein the front seats 12 are in the form of two separate and laterally spaced seats the section 9 of the cover member is suitably formed to provide envelopes or pockets 22 which envelop and receive the backs 10 of the seat 12 as clearly shown in Figure 2.

Where however the front seat of the automobile is in the form of one continuous seat the cover 1 may be modified to the extent of having a section 9a corresponding to the aforementioned section 9 free of any such pocket such as the aforementioned pockets 22 but may have its upper edge merely adapted to fold over the upper edge of the seat back as suggested at 9b in Figure 12.

In this second form of the invention the section 9a of the cover is held in proper position with respect to the back of the front seat through the medium of hooks 23 which are suitably secured in pockets 24 suitably provided on the cover section 9a adjacent opposite edges of said cover section and at a point spaced downwardly from the upper edge of the cover section so as to permit a draping of the edge portion 9b of the cover section 9a over the upper edge of the seat back 10b as suggested in Figure 13.

In this connection, and as clearly shown in Figure 13 it will be noted that the hooks 23 also engage over the upper edge of the seat back 10b so as to retain the cover section 9a in proper protective position with respect to the rear surface of the seat back 10b.

From the above it will be apparent that the upholstery protector or cover 1 when properly positioned in the tonneau of an automobile will conform substantially to the structural features of the seating arrangement to the end that the upholstery will be thoroughly protected against direct contact with any articles placed within the tonneau; and that further said cover 1 will also serve in the nature of a receptacle for the articles, and that the same can also be used whether or not the automobile is provided with the usual seat covers as are now generally used for protecting the upholstery.

It is obvious that such a cover may be used by sportsmen, produce merchants, beach bathers, salesmen and others who are desirous of protecting and preserving the interior appearances of the automobile.

Having thus described the invention, what is claimed as new is:

As a new article of manufacture, the covering described for the upholstered rear interior of an automobile, comprising essentially a sheet-like covering of fabric including sides, ends and a bottom, said sides and one of said ends having hems at their upper edges, metallic reinforcing strips in said hems of said sides, said reinforcing strips having inwardly directed end portions extending into the ends of the hems of said one end member, vertically disposed elongated pockets on said sides of the cover, hooks arranged to engage the edges of automobile windows to support the cover and having shanks extending downwardly in said pockets, and means connecting the reinforcing strips and the shanks of the hooks and adapted to secure the hooks in the pockets.

THOMAS G. WARE.